United States Patent
Lee et al.

(10) Patent No.: US 9,547,933 B2
(45) Date of Patent: Jan. 17, 2017

(54) DISPLAY APPARATUS AND DISPLAY METHOD THEREOF

(71) Applicant: Samsung Electronics Co., Ltd., Gyeonggi-do (KR)

(72) Inventors: Hye-won Lee, Gyeonggi-do (KR); Hyun-cheol Park, Gyeonggi-do (KR); Jung-hyun Shim, Gyeonggi-do (KR); Su-jin Yeon, Seoul (KR); Yeon-hee Lee, Seoul (KR); Yong-yeon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 545 days.

(21) Appl. No.: 13/683,590

(22) Filed: Nov. 21, 2012

(65) Prior Publication Data

US 2013/0127843 A1    May 23, 2013

(30) Foreign Application Priority Data

Nov. 22, 2011   (KR) .......................... 10-2011-0122435

(51) Int. Cl.
*G06T 15/10* (2011.01)
*H04N 13/00* (2006.01)

(52) U.S. Cl.
CPC ........... *G06T 15/10* (2013.01); *H04N 13/0022* (2013.01)

(58) Field of Classification Search
CPC  H04N 13/0022; H04N 13/026; H04N 13/007; H04N 13/004; H04N 13/0018; H04N 13/0456; H04N 2013/0081; G06T 7/0069; G06T 2207/10148; G06T 2207/10021; G09G 3/003; G09G 2354/00
See application file for complete search history.

(56) References Cited

U.S. PATENT DOCUMENTS

| | | | |
|---|---|---|---|
| 2005/0089212 A1 | 4/2005 | Mashitani et al. | |
| 2008/0240549 A1 | 10/2008 | Koo et al. | |
| 2009/0267958 A1 | 10/2009 | Bruls et al. | |
| 2011/0122235 A1* | 5/2011 | Lee .................. | H04N 13/0452 348/51 |
| 2011/0175907 A1* | 7/2011 | Tokuda .................. | 345/419 |
| 2012/0069143 A1* | 3/2012 | Chu .................. | 348/43 |
| 2012/0147139 A1* | 6/2012 | Li et al. .................. | 348/43 |

FOREIGN PATENT DOCUMENTS

| | | |
|---|---|---|
| KR | 1020110118420 | 10/2011 |
| KR | 101088144 | 12/2011 |
| WO | WO 2011114683 A1 * | 9/2011 |

* cited by examiner

*Primary Examiner* — Haixia Du
(74) *Attorney, Agent, or Firm* — The Farrell Law Firm, P.C.

(57) ABSTRACT

A display method and apparatus are provided. The method includes selecting at least one content to be focused of the plurality of content being displayed, adjusting a disparity value so that the selected content has a different depth value from other content, and displaying the content of which the disparity value has been adjusted.

12 Claims, 14 Drawing Sheets

MOVE RIGHT-EYE IMAGE FOR $-X_F$   MOVE LEFT-EYE IMAGE FOR $X_F$

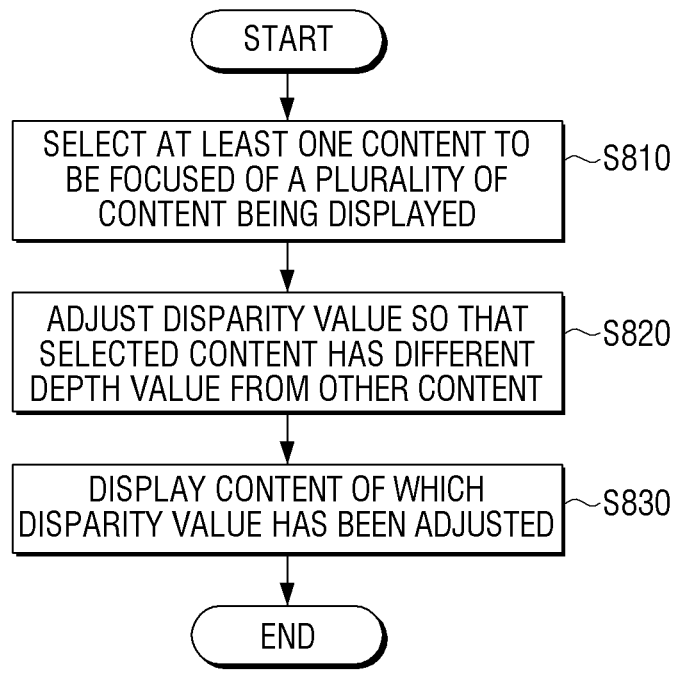

DISPLAY APPARATUS AND DISPLAY METHOD THEREOF

PRIORITY

This application claims priority under 35 U.S.C. §119(a) to Korean Patent Application Nos. 10-2011-0122435 filed on Nov. 22, 2011 in the Korean Intellectual Property Office, the contents of which are incorporated herein by reference.

BACKGROUND OF THE INVENTION

1. Field of the Invention

The present invention relates generally to a display apparatus and method, and more particularly, to a display apparatus and method that provide Three-Dimensional (3D) content.

2. Description of the Related Art

The 3D stereoscopic image technology is applicable to diverse fields, such as information communication, broadcasting, medical treatment, educational training, military affairs, games, animation, virtual reality, Computer Aided Design (CAD), industrial technology, and may be the core basic technology of the next-generation 3D stereoscopic multimedia information communication which is commonly required in these fields.

A 3D effect generally occurs through complex actions of the degree of change in thickness of a crystalline lens according to the position of an object to be observed, a difference in angle between both eyes and an object, a difference in position and shape of an object between left and right eyes, disparity in the movement of an object, and other effects caused by various types of psychologies and memories.

Among them, the binocular disparity that occurs due to a distance of about 6-7 cm between two human eyes is a very important factor. Due to the binocular disparity, because two eyes see the same object at different angles, different images are formed on the respective eyes. These two images are transferred to a viewer's brain through the retinas, and the brain accurately harmonizes these two images, resulting in the viewer realizing the original 3D stereoscopic image.

A 3D image is composed of a left-eye image that is recognized by a left eye and a right-eye image that is recognized by a right eye. The 3D display apparatus expresses a 3D effect of an image using the disparity between the left-eye image and the right-eye image. An environment in which a 3D image is implemented by alternately displaying the left-eye image and the right-eye image is called a stereo 3D image.

In order to focus content in a 2D (Two-Dimensional) image, image processing methods, such as highlight, scaling, and texture, have been used. However, visual fatigue occurs when focusing is performed using the additional image processing method for both the 2D image and the 3D image. Accordingly, there is a need in the art for a method and apparatus for image processing to prevent such visual fatigue.

SUMMARY OF THE INVENTION

The present invention has been made to address at least the above problems and/or disadvantages and to provide at least the advantages described below. Accordingly, an aspect of the present invention provides a display apparatus and a display method thereof, which can give a focusing effect through adjustment of disparity values of 3D content.

According to one aspect of the present invention, a method of displaying a plurality of content includes selecting at least one content to be focused of the plurality of content being displayed, adjusting a disparity value so that the selected content has a different depth value from other content, and displaying the content of which the disparity value has been adjusted.

According to another aspect of the present invention, a display apparatus includes a display unit displaying a plurality of content, and a control unit operating to display at least one content to be focused, which is selected from the plurality of content being displayed, through adjusting a disparity value so that the selected content has a different depth value from other content when the at least one content is selected.

BRIEF DESCRIPTION OF THE DRAWINGS

The above and other aspects, features and advantages of the present invention will be more apparent from the following detailed description when taken in conjunction with the accompanying drawings, in which:

FIG. 8 illustrates a display method according to an embodiment of the present invention.

DETAILED DESCRIPTION OF EMBODIMENTS OF THE PRESENT INVENTION

Hereinafter, preferred embodiments of the present invention are described in detail with reference to the accompanying drawings. A description of well-known functions or constructions will not be described in detail for the sake of clarity and conciseness.

Figure 1:
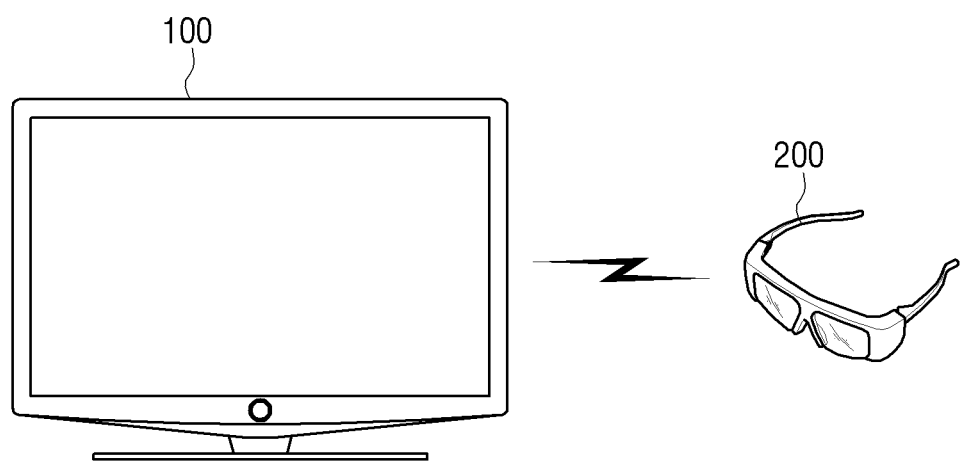
FIG. 1 illustrates a 3D display device according to an embodiment of the present invention.

FIG. 1 illustrates a display device 100 according to an embodiment of the present invention. As illustrated in FIG. 1, the display apparatus 100 is communicable with 3D glasses 200.

The display apparatus 100 generates and alternately displays a left-eye image and a right-eye image, and a user can view a stereo 3D image through alternate viewing of the left-eye image and the right-eye image that are displayed on the display apparatus 100 with the left eye and the right eye using the 3D glasses 200.

Specifically, the display apparatus 100 generates and alternately displays the left-eye image and the right-eye image on the screen at intervals. Further, the display apparatus 100 generates a synchronization signal for the generated left-eye image and right-eye image and transmits the generated synchronization signal to the 3D glasses 200.

The 3D glasses 200 receives the synchronization signal that is transmitted from the display apparatus 100, and alternately opens a left-eye glass and a right-eye glass in synchronization with the left-eye image and the right-eye image. However, this refers to when shutter glass type 3D glasses are used, and the present invention is also applicable to the use of passive type 3D glasses.

The display apparatus 100 can display content in a 3D Graphic User Interface (GUI) form on the screen together with the 3D image. That is, the 3D display apparatus 100 includes the GUI in the left-eye image and the right-eye image and displays the GUI with a specified depth value. Specifically, the display apparatus 100 may display the GUI with the depth value that corresponds to the position on the screen surface.

In particular, the display apparatus 100 can set the depth value of at least one of the plurality of content that is focused according to a preset event or a user command to be different from the depth values of other content. Accordingly, the 3D display apparatus can provide the focusing effect to a specified content without the necessity of passing through separate image processing, such as highlighting, scaling, texture, and perspective effect processing.

Figure 2:
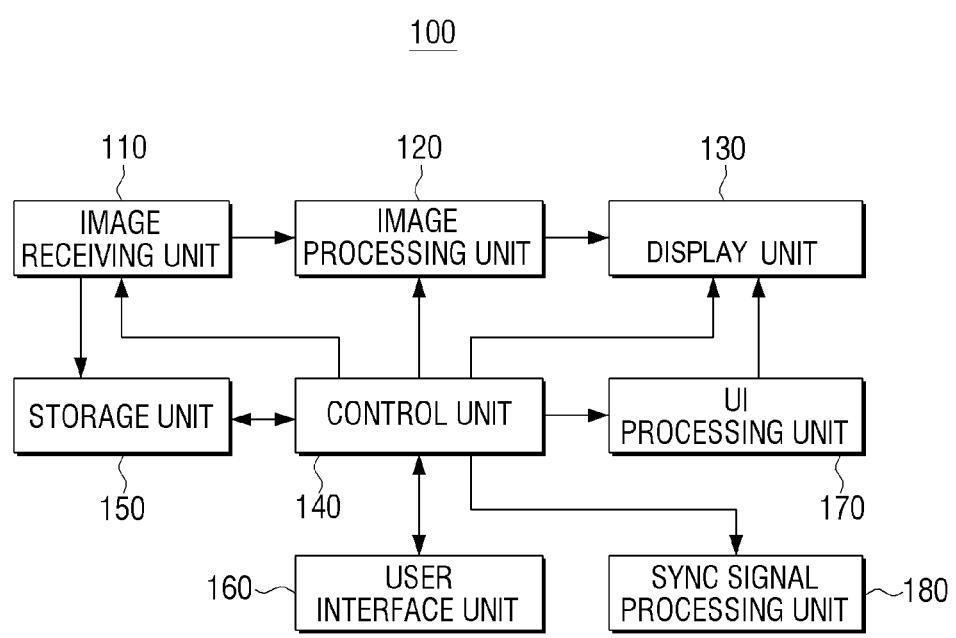
FIG. 2 illustrates a configuration of a 3D display apparatus according to an embodiment of the present invention.

FIG. 2 illustrates a configuration of a display apparatus according to an embodiment of the present invention.

Referring to FIG. 2, the display apparatus 100 includes an image receiving unit 110, an image processing unit 120, a display unit 130, a control unit 140, a storage unit 150, a user interface unit 160, a User Interface (UI) processing unit 170, and a sync signal processing unit 180.

Although the display apparatus 100 in FIG. 2 is a 3D Television (TV), the display apparatus 100 may be any device that can display 3D UI elements, such as a digital TV, a mobile communication terminal, a mobile telephone, a Personal Digital Assistant (PDA), a smart phone, a Digital Multimedia Broadcasting (DMB) phone, a Motion Pictures Experts Group Layer Audio 3 (MP3) player, an audio appliance, a portable TV, and a digital camera.

The image receiving unit 110 receives and demodulates a 2D or 3D image signal that is received by wire or wirelessly from a broadcasting station or a satellite. The image receiving unit 110 may be connected to an external appliance, such as a camera, to receive a 3D image from the external appliance. The external appliance may be connected wirelessly or by wire through an interface such as S-Video, component, composite, D-Sub, Digital Visual Interface (DVI), and High Definition Multimedia Interface (HDMI). Since a 2D image processing method is well known to those skilled in the art, the following explanation will be based on a 3D image processing method.

As described above, a 3D image is composed of at least one frame. One frame may include a left-eye image and a right-eye image, or each frame may be composed of a left-eye frame or a right-eye frame. That is, a 3D image may be generated according to one of diverse 3D formats.

The image receiving unit 110 transfers the received 2D image or 3D image to the image processing unit 120.

The image processing unit 120 performs signal processing, such as video decoding, format analysis, and video scaling, and a GUI addition, with respect to the 2D image or 3D image that is received in the image receiving unit 110.

In particular, the image processing unit 120 generates a left-eye image and a right-eye image, which correspond to the size of one screen (for example, 1920*1080) using the format of the 2D image or 3D image that is input to the image receiving unit 110.

For example, the image processing unit 120 generates the left-eye image and right-eye image to be provided to the user by extracting a left-eye image portion and a right-eye image portion from each image frame and performing expansion scaling or interpolation of the extracted left-eye image and right-eye image.

If the format of the 3D image is of a general frame sequence type, the image processing unit 220 extracts the left-eye image or the right-eye image from each frame and prepares to provide the extracted image to the user.

Information on the format of the input 3D image may or may not be included in the 3D image signal.

For example, if the information on the format of the input 3D image is included in the 3D image signal, the image processing unit 120 extracts the information on the format by analyzing the 3D image, and processes the received 3D image according to the extracted information. By contrast, if the information on the format of the input 3D image is not included in the 3D image signal, the image processing unit 120 processes the received 3D image according to the format input from the user, or processes the received 3D image according to a preset format.

The image processing unit 120 performs time division of the extracted left-eye image and right-eye image and alternately transfers the time-divided left-eye image and right-eye image to the display unit 130. That is, the image processing unit 120 transfers the left-eye image and the right-eye image to the display unit 130 in the temporal order of "left-eye image (L1)→right-eye image (R1)→left-eye image (L2)→right-eye image (R2)→ . . . ".

The image processing unit 120 may insert an On-Screen Display (OSD) image generated by an OSD processing unit 150 into a black image, or process and provide the OSD image as one image.

The display unit 130 alternately outputs the left-eye image and the right-eye image output from the image processing unit 120 to the user.

The control unit 140 controls the overall operation of the display apparatus 100 according to a user command transferred from the user interface unit 170 or a preset option.

In particular, the control unit 140 controls the image receiving unit 110 and the image processing unit 120 to receive the 3D image, separate the received 3D image into a left-eye image and a right-eye image, and perform scaling or interpolation of the separated left-eye image and right-eye image such that the separated left-eye image and right-eye image are displayable on one screen.

The control unit 140 controls the display unit 130 to be switched so that the polarization direction of the image that is provided through the display unit 130 coincides with the left-eye image or the right-eye image.

The control unit 140 may also control the operation of the UI processing unit 170 to be described later.

The UI processing unit 150 may generate content that is displayed to overlap the 2D or 3D image output to the display unit 130 in a GUI form, and insert the content into the 3D image. The content is, for example, a menu screen, caution expression, characters or figures indicating time or channel number, application.

As a user operates input devices such as an operation panel and a remote controller in order to select a desired function from the menus, a main menu or a sub-menu may be displayed on the display screen as UI elements in an OSD form. Such menus may include option items that can be selected in the display apparatus or items that can adjust the function of the display apparatus.

The UI processing unit 150 may perform tasks of 2D/3D conversion of UI elements, transparency, color, size, shape and position adjustment, highlighting, and animation effect, under the control of the control unit 140.

The storage unit 160 is a storage medium in which various kinds of programs which are required to operate the 3D image display apparatus 100 are stored, and may be implemented by a memory or a Hard Disk Drive (HDD). For example, the storage unit may include a ROM for storing programs for performing the operation of the control unit 140, and a RAM for temporarily storing data according to the operation performance of the control unit 140. The storage unit 160 may further include an Electrically Erasable and Programmable ROM (EEPROM) for storing various reference data.

The user interface unit 170 transfers a user command that is received from input means such as a remote controller or an input panel, to the control unit 140.

The control unit 140 controls the image receiving unit 110 and the image processing unit 120 to receive the 3D image, separates the received 3D image into a left-eye image and a right-eye image, and performs scaling or interpolation of the separated left-eye image and right-eye image such that the separated left-eye image and right-eye image are displayable on one screen.

The control unit 140 may set depth values of the plurality of content displayed on the display unit 130, and may set the depth value of the content to be focused of the plurality of content to be different from the depth values of other content.

The depth value indicates the degree of depth perception in the 3D image. The 3D image can express the depth perception that corresponds to the upper, lower, left, and right positions on the screen, as well as the depth perception that corresponds to the positions in the viewer's forward and backward eye directions. In this case, the depth perception is determined by the disparity between the left-eye image and the right-eye image. Accordingly, the depth value of the 3D content corresponds to the disparity between the left-eye image and the right-eye image.

If a user command for focusing at least one content of the plurality of content is input, the control unit 140 may reset the depth value of the corresponding content. If necessary, it may be possible to reset the depth values of other content.

Further, the highlight effect may become successively clearer through successive changing of the depth value of the corresponding content.

For example, if the depth value of the corresponding content item is changed from −4 to 0, the control unit 140 operates to display the corresponding content item once at respective depth values of −3, −2, and −1 to make the highlight effect become gradually clearer from −4 to 0.

The 3D display apparatus 100 as configured above can display stereo 3D content. In particular, since the focusing effect can be implemented by adjusting only the disparity between the left-eye image and the right-eye image of the corresponding content, the focusing effect can be provided without having to pass through additional image processing.

Figure 3A:
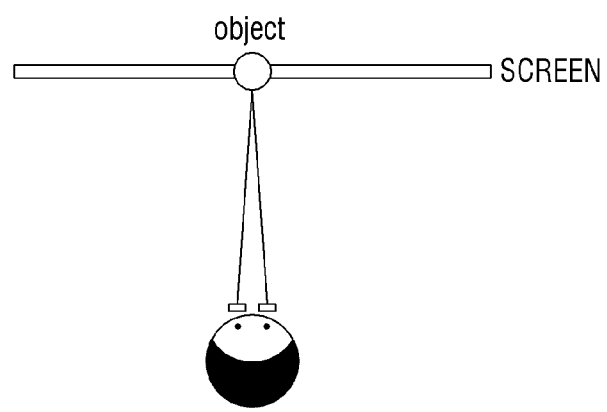
FIGS. 3A to 3C illustrate the principle of providing a 3D effect in a stereo 3D image according to an embodiment of the present invention.
Figure 3B:
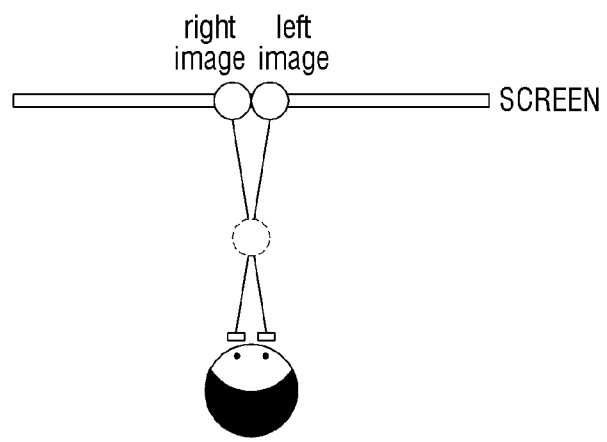
Figure 3C:
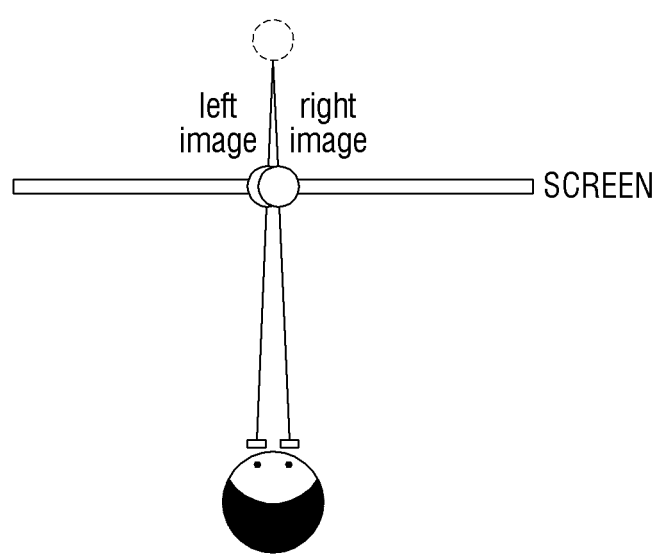

FIGS. 3A to 3C illustrate the principle of providing a 3D effect in a stereo 3D image according to an embodiment of the present invention.

Referring to FIG. 3A, a user focuses one image generated on the screen as a general video image of an object, and thus perceives distance as long as a space between the user and the screen.

Referring to FIG. 3B, the right-eye image and the left-eye image are separated in a cross direction and are projected toward the user as an image having a positive (+) depth value so that the object is seen to project in front, and thus the user has a stereoscopic perception in which the user perceives the corresponding object to be closer than the actual position of the object. This is known as crossed disparity.

Referring to FIG. 3C, the right-eye image and the left-eye image are separated in their respective directions and are projected toward the user as an image having a negative (−) depth value so that the object is perceived to be recessed in the rear of the screen, and thus the user has a stereoscopic perception of the corresponding object being farther away than the actual position of the object. This is known as uncrossed disparity.

Figure 4A:
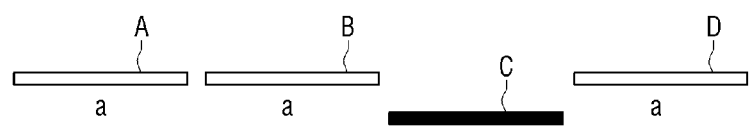
FIGS. 4A and 4B illustrate a content focusing method according to an embodiment of the present invention.
Figure 4B:
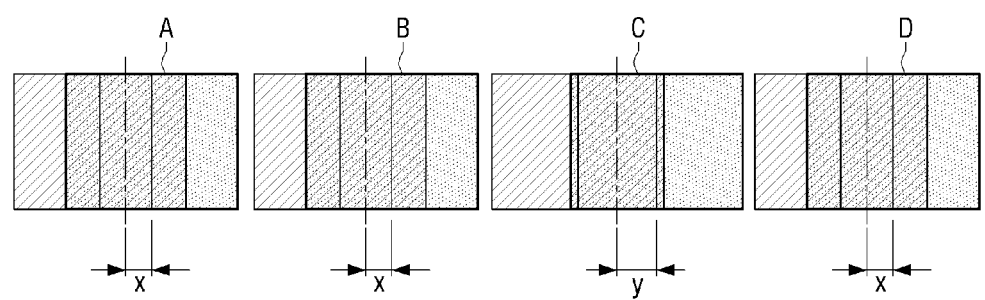

FIGS. 4A and 4B illustrate a content focusing method according to an embodiment of the present invention.

As illustrated in FIG. 4A, when there is no disparity among a plurality of UI content A, B, and D, a focusing effect can be provided to UI content C to be focused by giving a different disparity value to the corresponding content, which may include text or a still image in addition to dynamic content.

That is, as illustrated in FIG. 4B, when the crossed disparity values of the plurality of UI content A, B, and D are equally x, the focusing effect can be provided to the UI content C to be focused by giving a crossed disparity value y that is larger than the value x to the corresponding content.

Figure 5A:
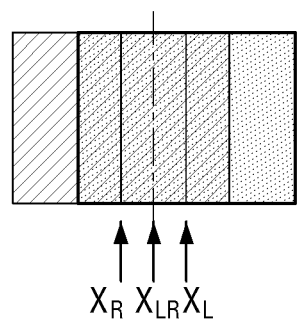
FIGS. 5A and 5C illustrate the content focusing method illustrated in FIGS. 4A and 4B.
Figure 5B:
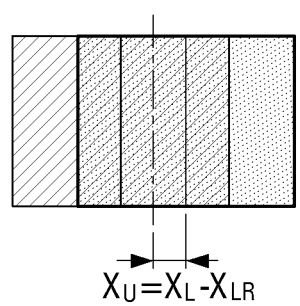
Figure 5C:
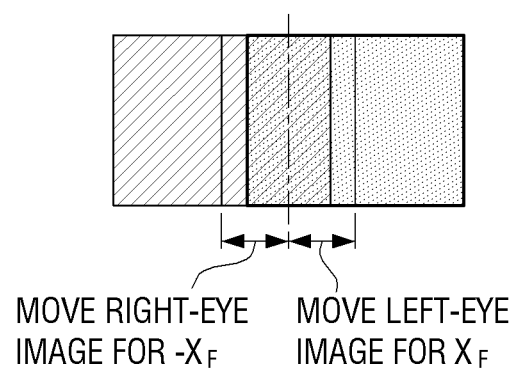

FIGS. 5A and 5C illustrate the content focusing method illustrated in FIGS. 4A and 4B.

As illustrated in FIG. 5A, if it is assumed that average positions of the left-eye image and the right-eye image that correspond to specified content are $X_L$ and $X_R$, and an average position of $X_L$ and $X_R$ is $X_{LR}$, a distance value $X_U$ between $X_{LR}$ and $X_L$ (or a distance value between $X_{LR}$ and $X_R$) as illustrated in FIG. 5B may be the crossed disparity value.

However, as illustrated in FIG. 5C, if the crossed disparity value of the left-eye image and the right-eye image of the corresponding content is set to $X_F$ that is different from the crossed disparity values of other content, the focusing effect can be provided to the corresponding content through movement of the left-eye image and the right-eye image as long as a distance from $X_{LR}$ to $X_F$.

Figure 6A:
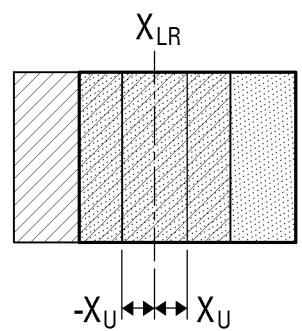
FIGS. 6A and 6F illustrate the content focusing method illustrated in FIGS. 4A and 4B.
Figure 6B:
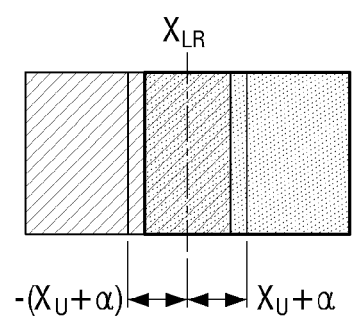
Figure 6C:
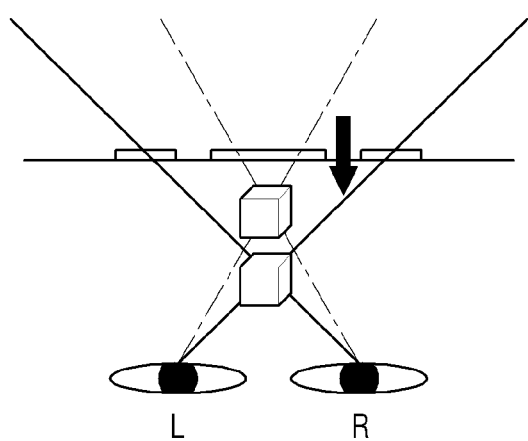
Figure 6D:
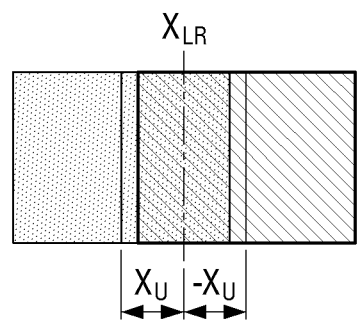
Figure 6E:
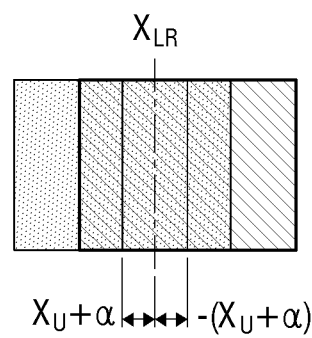
Figure 6F:
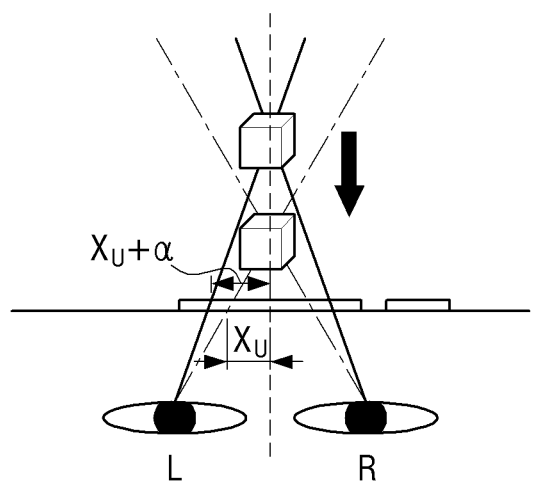

FIGS. 6A and 6F illustrate the content focusing method illustrated in FIGS. 4A and 4B.

Specifically, FIGS. 6A to 6F illustrate a method of causing the focused content to appear to project relatively.

Hereinafter, a case in which the content is positioned on Z0 or Z+ axis and a case in which the content Z0 is positioned on Z− axis will be separately described.

The Content is Positioned on Z0 or Z+ Axis

As illustrated in FIG. 6A, if it is assumed that the crossed disparity value of the plurality of non-selected content is $X_U$, the left-eye image is moved for $X_U$ from the center (average x-axis position value of the left-eye image and the right-eye image: $X_{LR}$) to the right side, and the right-eye image is moved for $−X_U$.

As illustrated in FIG. 6B, the crossed disparity value of the selected content may be set to be larger than $X_U$ in order to allow the selected content, that is, the focused content, to appear to project in the user direction in comparison to the non-selected content. For example, the left-eye image may be moved from the center $X_{LR}$ with a larger value than $X_U$, and the right-eye image may be moved from the center with a smaller value than $−X_U$. Numerically, the left-eye image may be moved from the center $X_{LR}$ with a larger value than $X_U$, that is, as large as a value of $X_U+\alpha$ ($\alpha>0$), and the right-eye image may be moved from the center $X_{LR}$ as large as a value of $−(X_U+\alpha)$ ($\alpha>0$).

FIG. 6C illustrates the change of content position according to the content focusing method illustrated in FIGS. 6A and 6B.

As illustrated in FIG. 6C, by changing the crossed disparity value from the shape illustrated in FIG. 6A to the shape illustrated in FIG. 6B, the focusing can be performed so that the content appears to project relatively compared with other contents in the user direction.

The Content is Positioned on Z− Axis

As illustrated in FIG. 6D, if it is assumed that the crossed disparity value of the plurality of non-selected content is $X_U$, the left-eye image is moved for $X_U$ from the center (average x-axis position value of the left-eye image and the right-eye image: $X_{LR}$), and the right-eye image is moved for $-X_U$.

In this case, as illustrated in FIG. 6E, the crossed disparity value of the selected content may be set to be larger than $X_U$ in order to allow the selected content, that is, the focused content, be appear to relatively project in the user direction in comparison to the non-selected content. For example, the left-eye image may be moved from the center $X_{LR}$ with a larger value than $X_U$, and the right-eye image may be moved from the center with a smaller value than $-X_U$. Numerically, the left-eye image may be moved from the center $X_{LR}$ with a larger value than $X_U$, that is, as large as a value of $X_U+\alpha$ ($\alpha>0$), and the right-eye image may be moved from the center $X_{LR}$ as large as a value of $-(X_U+\alpha)$ ($\alpha>0$).

FIG. 6F illustrates the change of content position according to the content focusing method illustrated in FIGS. 6D and 6E.

As illustrated in FIG. 6F, by changing the crossed disparity value from the shape illustrated in FIG. 6D to the shape illustrated in FIG. 6E, the focusing can be performed so that the content appears to project relatively in the user direction.

FIGS. 7A to 7F illustrate the content focusing method illustrated in FIGS. 4A and 4B.

Specifically, FIGS. 7A to 7F illustrate a method of causing the focused content to appear to project relatively compared with other contents.

Hereinafter, a case in which the content is positioned on Z0 or Z+ axis and a case in which the content Z0 is positioned on Z− axis will be separately described.

The Content is Positioned on Z0 or Z+ Axis

Figure 7A:
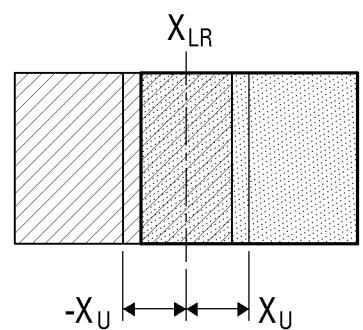
FIGS. 7A to 7F illustrate the content focusing method illustrated in FIGS. 4A and 4B.

As illustrated in FIG. 7A, if it is assumed that the crossed disparity value of the plurality of non-selected content is $X_U$, the left-eye image is moved for $X_U$ from the center (average x-axis position value of the left-eye image and the right-eye image: $X_{LR}$) to the right side, and the right-eye image is moved for $-X_U$.

Figure 7B:
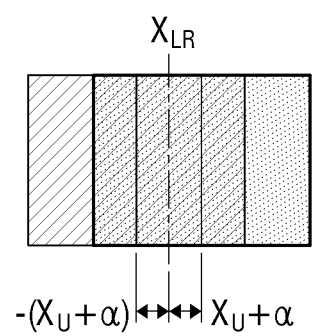

In this case, as illustrated in FIG. 7B, the crossed disparity value of the selected content may be set to be smaller than $X_U$ in order to allow the selected content, that is, the focused content, to appear to be recessed in the user direction in comparison to the non-selected content. For example, the left-eye image may be moved from the center $X_{LR}$ with a smaller value than $X_U$, and the right-eye image may be moved from the center with a larger value than $-X_U$. Numerically, the left-eye image may be moved from the center $X_{LR}$ with a smaller value than $X_U$, that is, as large as a value of $X_U+\alpha$ ($\alpha<0$), and the right-eye image may be moved from the center $X_{LR}$ as large as a value of $-(X_U+\alpha)$ ($\alpha<0$).

Figure 7C:
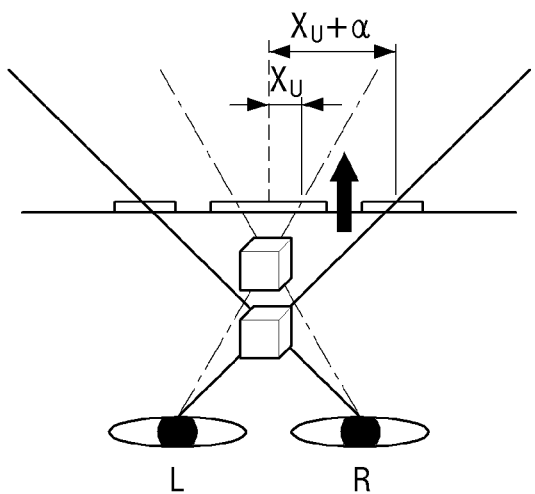

FIG. 7C illustrates the change of content position according to the content focusing method illustrated in FIGS. 7A and 7B.

As illustrated in FIG. 7C, by changing the crossed disparity value from the shape illustrated in FIG. 7A to the shape illustrated in FIG. 7B, the focusing can be performed so that the content appears to be recessed relatively in an opposite direction to the user direction.

The Content is Positioned on Z− Axis

Figure 7D:
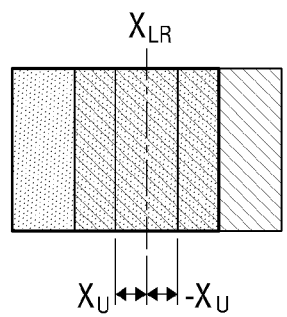

As illustrated in FIG. 7D, if it is assumed that the crossed disparity value of the plurality of non-selected content is $X_U$, the left-eye image is moved for $X_U$ from the center (average x-axis position value of the left-eye image and the right-eye image: $X_{LR}$), and the right-eye image is moved for $-X_U$.

Figure 7E:
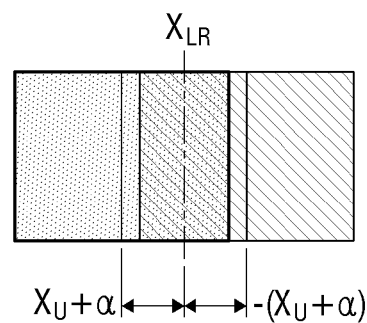

In this case, as illustrated in FIG. 7E, the crossed disparity value of the selected content may be set to be smaller than $X_U$ in order to allow the selected content, that is, the focused content, be appear to be recessed in the user direction in comparison to the non-selected content. For example, the left-eye image may be moved from the center $X_{LR}$ with a smaller value than $X_U$, and the right-eye image may be moved from the center with a larger value than $-X_U$. Numerically, the left-eye image may be moved from the center $X_{LR}$ with a smaller value than $X_U$, that is, as large as a value of $X_U+\alpha$ ($\alpha<0$), and the right-eye image may be moved from the center $X_{LR}$ as large as a value of $-(X_U+\alpha)$ ($\alpha<0$).

Figure 7F:
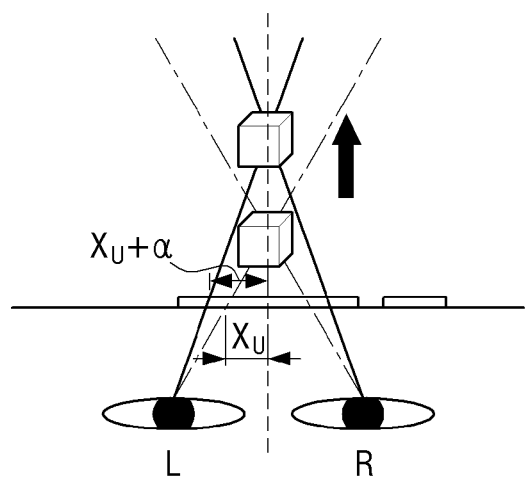

FIG. 7F illustrates the change of content position according to the content focusing method illustrated in FIGS. 7D and 7E.

As illustrated in FIG. 7F, by changing the crossed disparity value from the shape illustrated in FIG. 7D to the shape illustrated in FIG. 7E, the focusing can be performed so that the content appears to be recessed relatively in the opposite direction to the user direction.

FIG. 8 illustrates a display method according to an embodiment of the present invention.

Referring to FIG. 8, in step S810, when at least one content to be focused of the plurality of content being displayed is selected, the disparity value is adjusted in step 820 so that the selected content has a different depth value from other content.

Then, in step S830, the content of which the disparity value has been adjusted is displayed.

Step S820 of adjusting the disparity value may also provide a calculation of crossed disparity values of the plurality of content, and set the crossed disparity value of the selected content to be different from the calculated crossed disparity value.

The crossed disparity value may be a distance for which the left-eye image and the right-eye image, which constitute the selected content, are spaced apart in left and right directions from the reference position, which may be an average position of the left-eye image and the right-eye image on the x axis.

Step S820 of adjusting the disparity value may also set the crossed disparity value of the selected content to be larger than the calculated crossed disparity value so that the selected content is seen to project in the user direction.

Specifically, when the crossed disparity value of the selected content is set to be larger than the crossed disparity value that is calculated with respect to the plurality of content, the left-eye image may be moved from the reference position so that the left-eye image has a larger value than the calculated crossed disparity value, and the right-eye image may be moved from the reference position so that the right-eye image has a smaller value than the calculated crossed disparity value.

Step S820 of adjusting the disparity value may also set the crossed disparity value of the selected content to be smaller than the crossed disparity value that is calculated with respect to the plurality of content so that the selected content appears to be recessed in the opposite direction to the user direction.

Specifically, when the crossed disparity value of the selected content is set to be smaller than the calculated crossed disparity value, the left-eye image may be moved from the reference position so that the left-eye image has a smaller value than the calculated crossed disparity value, and the right-eye image may be moved from the reference position so that the right-eye image has a larger value than the calculated crossed disparity value.

The present invention may include a storage medium, that is, a computer readable recording medium, which includes a program for executing the display method according to an embodiment of the present invention as described above. The computer readable recording medium includes various types of recording devices in which data that can be read by a computer system is stored. Examples of computer readable recording media may include, for example, a Read-Only Memory (ROM), a Random Access Memory (RAM), a CD-ROM, a magnetic tape, a floppy disk, and an optical data storage device. The computer readable recording medium may be distributed into computer systems connected through a network, and codes, which can be read by computers in a distribution method, may be stored and executed.

As described above, according to the present invention, the 3D display apparatus can provide the focusing effect to a specified content without the necessity of passing through separate image processing.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A method of displaying a three-dimensional (3D) content and a plurality of graphic user interfaces (GUIs) to control a display apparatus, the method comprising:
    displaying the 3D content on a screen;
    displaying, while the 3D content is displayed, the plurality of GUIs in a 3D form according to a user manipulation by overlapping the plurality of GUIs with the 3D content;
    selecting at least one GUI to be focused of the plurality of GUIs being displayed on the screen;
    adjusting a disparity value of the selected at least one GUI to change a depth value of the selected GUI to be different from that of other GUIs to make a highlight effect become gradually clearer; and
    displaying the selected at least one GUI of which the disparity value has been adjusted,
    wherein adjusting the disparity value further comprises:
    calculating crossed disparity values of the plurality of GUIs;
    setting the crossed disparity value of the selected at least one GUI to be different from the calculated crossed disparity values; and
    moving a left-eye image and a right eye image of the selected at least one GUI at an opposite direction from a reference position on the screen so that the selected at least one GUI appears to be one of recessed in an opposite direction to a user direction or projected in the user direction,
    wherein, to calculate the crossed disparity value, cross disparity is based on the left-eye image and the right eye image being separated in a cross direction relative to one another and the user such that the left-eye image is disposed in front of a right eye of the user and the right-eye image is disposed in front of a left eye of the user.

2. The method as claimed in claim 1, wherein the crossed disparity value is a distance for which the left-eye image and the right-eye image, which constitute the selected at least one GUI, are spaced apart in right and left directions, respectively, from the reference position on the screen, and the reference position is an average position of the left-eye image and the right-eye image on an x– axis.

3. The method as claimed in claim 2, wherein adjusting the disparity value sets the crossed disparity value of the selected at least one GUI to be larger than the calculated crossed disparity values so that the selected at least one GUI appears to project in the user direction.

4. The method as claimed in claim 3, wherein adjusting the disparity value moves the left-eye image from the reference position so that the left-eye image has a larger value than the calculated crossed disparity values, and moves the right-eye image from the reference position so that the right-eye image has a smaller value than a negative value of the calculated crossed disparity values when the crossed disparity value of the selected at least one GUI is set to be larger than the calculated crossed disparity values.

5. The method as claimed in claim 2, wherein adjusting the disparity value sets the crossed disparity value of the selected at least one GUI to be smaller than the calculated crossed disparity values so that the selected at least one GUI appears to be recessed in the opposite direction to the user direction.

6. The method as claimed in claim 5, wherein adjusting the disparity value moves the left-eye image from the reference position so that the left-eye image has a smaller value than the calculated crossed disparity values, and moves the right-eye image from the reference position so that the right-eye image has a larger value than a negative value of the calculated crossed disparity values when the crossed disparity value of the selected at least one GUI is set to be smaller than the calculated crossed disparity values.

7. A display apparatus comprising:
    a display unit which displays a three-dimensional (3D) content on a screen and a plurality of graphic user interfaces (GUIs) in a three-dimensional (3D) form to control the display apparatus; and
    a control unit which controls the display unit to display, while the 3D content is displayed, the plurality of GUIs according to a user manipulation by overlapping the plurality of GUIs with the 3D content, and controls the display of at least one GUI to be focused, which is selected from the plurality of GUIs being displayed on the screen, by adjusting a disparity value of the selected at least one GUI and changing a depth value of the selected at least one GUI to be different from that of other GUIs to make a highlight effect become gradually clearer when the at least one GUI is selected,
    wherein the control unit calculates crossed disparity values of the plurality of GUIs, sets the crossed disparity value of the selected at least one GUI to be different from the calculated crossed disparity values, and moves a left-eye image and a right eye image of the selected at least one content at an opposite direction from a reference position on the screen so that the selected at least one GUI appears to be one of recessed in an opposite direction to a user direction or projected in the user direction, wherein, to calculate the crossed disparity value, cross disparity is based on the left-eye image and the right eye image being separated in a cross direction relative to one another and the user such that the left-eye image is disposed in front of a right eye of the user and the right-eye image is disposed in front of a left eye of the user.

8. The display apparatus as claimed in claim 7, wherein the crossed disparity value is a distance for which the left-eye image and the right-eye image, which constitute the selected at least one GUI, are spaced apart in right and left directions, respectively, from the reference position on the display unit, and the reference position is an average position of the left-eye image and the right-eye image on an x– axis.

9. The display apparatus as claimed in claim 8, wherein the control unit sets the crossed disparity value of the selected at least one GUI to be larger than the calculated crossed disparity values so that the selected at least one GUI appears to project in the user direction.

10. The display apparatus as claimed in claim 9, wherein the control unit moves the left-eye image from the reference position so that the left-eye image has a larger value than the calculated crossed disparity values, and moves the right-eye image from the reference position so that the right-eye image has a smaller value than a negative value of the calculated crossed disparity values when the crossed disparity value of the selected at least one GUI is set to be larger than the calculated crossed disparity values.

11. The display apparatus as claimed in claim 8, wherein the control unit sets the crossed disparity value of the selected at least one GUI to be smaller than the calculated crossed disparity values so that the selected at least one GUI appears to be recessed in the opposite direction to the user direction.

12. The display apparatus as claimed in claim 11, wherein the control unit moves the left-eye image from the reference position so that the left-eye image has a smaller value than the calculated crossed disparity values, and moves the right-eye image from the reference position so that the right-eye image has a larger value than a negative value of the calculated crossed disparity values when the crossed disparity value of the selected at least one GUI is set to be smaller than the calculated crossed disparity values.

* * * * *